United States Patent
Fehring et al.

(10) Patent No.: US 8,851,515 B2
(45) Date of Patent: Oct. 7, 2014

(54) METHOD AND DEVICE FOR PROTECTING A VEHICLE OCCUPANT IN A VEHICLE SEAT OF A VEHICLE

(75) Inventors: Michael Fehring, Neuhausen (DE); Marica Paurevic, Herrenberg (DE); Thomas Unselt, Stuttgart (DE)

(73) Assignee: Daimler AG, Stuttgart (DE)

(*) Notice: Subject to any disclaimer, the term of this patent is extended or adjusted under 35 U.S.C. 154(b) by 0 days.

(21) Appl. No.: 13/989,079

(22) PCT Filed: Oct. 22, 2011

(86) PCT No.: PCT/EP2011/005355
§ 371 (c)(1),
(2), (4) Date: Jul. 31, 2013

(87) PCT Pub. No.: WO2012/069116
PCT Pub. Date: May 31, 2012

(65) Prior Publication Data
US 2013/0300165 A1 Nov. 14, 2013

(30) Foreign Application Priority Data
Nov. 24, 2010 (DE) .......................... 10 2010 052 412

(51) Int. Cl.
*B60R 21/013* (2006.01)
*B60R 21/207* (2006.01)
*B60N 2/427* (2006.01)
*B60R 21/01* (2006.01)
*B60N 2/42* (2006.01)
*B60N 2/44* (2006.01)

(52) U.S. Cl.
CPC . *B60N 2/42* (2013.01); *B60R 21/01* (2013.01); *B60R 21/207* (2013.01); *B60N 2/427* (2013.01); *B60N 2/4279* (2013.01); *B60N 2/449* (2013.01); *B60N 2/42727* (2013.01)

USPC ........ 280/735; 180/274; 180/282; 280/730.2; 701/45

(58) Field of Classification Search
USPC ............... 180/274, 282; 280/730.2, 734, 735; 297/216.1, 216.13; 701/45
See application file for complete search history.

(56) References Cited

U.S. PATENT DOCUMENTS 5,301,772 A * 4/1994 Honda .......................... 180/268
5,330,226 A * 7/1994 Gentry et al. .................. 280/735
(Continued)

FOREIGN PATENT DOCUMENTS

DE 10 2005 032 033 A1 8/2007
DE 10 2006 003 365 A1 8/2007
(Continued)

OTHER PUBLICATIONS

International Search Report with English translation dated Jan. 18, 2012 (four (4) pages).
(Continued)

*Primary Examiner* — Paul N Dickson
*Assistant Examiner* — Laura Freedman
(74) *Attorney, Agent, or Firm* — Crowell & Moring LLP

(57) ABSTRACT

A method for protecting a vehicle occupant in a vehicle seat of a vehicle that includes at least one protection element arranged on the vehicle seat and that can be triggered in order to protect the vehicle occupant located on the vehicle seat is triggered in the event of an impending collision or in the event of a collision. A momentum (motion impulse) is exerted on the vehicle occupant or at least one body section of the vehicle occupant when the protection element is triggered. Due to the momentum the vehicle occupant or at least one body section of the vehicle occupant is moved away from a collision section of the vehicle that is colliding or will collide with the object. The intensity of the momentum is varied in relation to a determined accident severity and/or a determined accident type.

10 Claims, 1 Drawing Sheet

(56) References Cited

U.S. PATENT DOCUMENTS

| | | | |
|---|---|---|---|
| 5,499,840 A * | 3/1996 | Nakano | 280/730.1 |
| 5,730,458 A * | 3/1998 | Byon | 280/730.2 |
| 5,871,231 A * | 2/1999 | Richards et al. | 280/735 |
| 5,908,219 A | 6/1999 | Bohmler | |
| 5,947,514 A * | 9/1999 | Keller et al. | 280/742 |
| 6,186,539 B1 * | 2/2001 | Foo et al. | 280/735 |
| 6,199,903 B1 * | 3/2001 | Brambilla et al. | 280/735 |
| 6,209,909 B1 * | 4/2001 | Breed | 280/735 |
| 6,398,257 B1 * | 6/2002 | Ehama et al. | 280/735 |
| 6,496,764 B1 * | 12/2002 | Wang | 701/45 |
| 6,499,763 B1 * | 12/2002 | Mishima | 280/733 |
| 6,512,969 B1 * | 1/2003 | Wang | 701/45 |
| 6,529,810 B2 * | 3/2003 | Foo et al. | 701/45 |
| 6,571,161 B2 * | 5/2003 | Browne et al. | 701/45 |
| 6,678,599 B2 * | 1/2004 | Eisele et al. | 701/45 |
| 6,748,307 B1 * | 6/2004 | Sala et al. | 701/46 |
| 6,804,595 B1 * | 10/2004 | Quail et al. | 701/45 |
| 6,816,766 B2 * | 11/2004 | Sala et al. | 701/45 |
| 6,882,914 B2 * | 4/2005 | Gioutsos et al. | 701/45 |
| 6,898,498 B1 * | 5/2005 | Wessels et al. | 701/45 |
| 7,140,637 B2 * | 11/2006 | Roelleke et al. | 280/735 |
| 7,260,461 B2 * | 8/2007 | Rao et al. | 701/45 |
| 7,292,921 B2 * | 11/2007 | Schuller et al. | 701/45 |
| 7,374,223 B2 * | 5/2008 | Dauber et al. | 296/65.11 |
| 8,297,651 B2 * | 10/2012 | Kwon et al. | 280/730.2 |
| 8,459,690 B2 * | 6/2013 | Breuninger et al. | 280/730.2 |
| 8,594,894 B2 * | 11/2013 | Baumann et al. | 701/45 |
| 2004/0232666 A1 * | 11/2004 | Sato et al. | 280/730.2 |
| 2005/0035634 A1 | 2/2005 | Daeuber et al. | |
| 2006/0091653 A1 * | 5/2006 | De Mersseman et al. | 280/735 |
| 2006/0196715 A1 * | 9/2006 | Fujishiro et al. | 180/271 |
| 2006/0202454 A1 * | 9/2006 | Parizal et al. | 280/735 |
| 2006/0226640 A1 * | 10/2006 | Prakah-Asante et al. | 280/735 |
| 2008/0185825 A1 * | 8/2008 | Stuetzler et al. | 280/735 |
| 2010/0090448 A1 | 4/2010 | Pursche et al. | |

FOREIGN PATENT DOCUMENTS

| | | |
|---|---|---|
| DE | 10 2007 013 543 A1 | 9/2008 |
| EP | 0 811 534 A1 | 12/1997 |
| EP | 1 698 521 A1 | 9/2006 |
| FR | 2 910 853 A1 | 7/2008 |
| WO | WO 03/033294 A1 | 4/2003 |
| WO | WO 2008/110610 A1 | 9/2008 |

OTHER PUBLICATIONS

German-language Written Opinion (PCT/ISA/237) dated Jan. 18, 2012 (six (6) pages).

German Office Action dated Oct. 19, 2011 (five (5) pages).

* cited by examiner

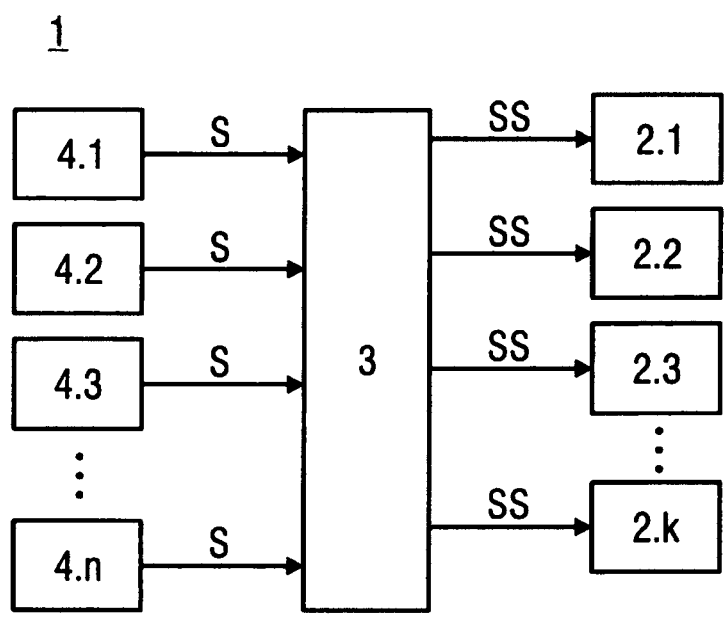

METHOD AND DEVICE FOR PROTECTING A VEHICLE OCCUPANT IN A VEHICLE SEAT OF A VEHICLE

BACKGROUND AND SUMMARY OF THE INVENTION

Exemplary embodiments of the present invention relate to a method and device for protecting a vehicle occupant in a vehicle seat of a vehicle.

PCT publication WO 03/033 294 A1 describes a vehicle seat that effects a lateral displacement of the occupant sitting on the vehicle seat in the event of a lateral impact or immediately before a lateral impact. The sideways displacement is in a direction away from the vehicle side facing the impact and towards the center of the vehicle. In order to achieve the sideways displacement at least one seat cushion can be moved transversely in relation to the seat attachment and independently of other seat components.

PCT publication WO 2008/110610 A1 describes a vehicle seat assembly for a vehicle comprising a vehicle seat, at least one inflatable element arranged on the vehicle seat, means for inflating the inflatable element that, in response to a control signal signaling an impending collision of the vehicle with an object, inflate the inflatable element. The inflatable element is configured and arranged in such a way that, as it is being inflated in response to the control signal, it exerts an impulse on a vehicle occupant sitting on the vehicle seat, which impulse moves the vehicle occupant away from a collision section of the vehicle about to collide with the object. In addition PCT publication WO 2008/110610 A1 describes a method for protecting a vehicle occupant.

EPO publication EP 1 698 521 A1 describes a device and a method for protecting occupants in a vehicle.

Published German patent application DE 10 2005 032 033 A1 describes a vehicle occupant restraint system comprising a vehicle seat of which the backrest is laterally delimited by at least one side wall, wherein the transition region from a front side of the backrest to the side wall forms a support surface for a vehicle occupant, and further comprising an airbag module, the air bag of which is accommodated in a folded state in the backrest of the vehicle seat and the unfolding direction of which is oriented towards the support surface.

Exemplary embodiments of the present invention are directed to an improved, in particular more effective method and an improved device for protecting a vehicle occupant in a vehicle seat of a vehicle compared to those of the prior art.

In the method for protecting a vehicle occupant in a vehicle seat of a vehicle, in particular a passenger car, at least one protection element arranged on the vehicle seat and capable of being triggered in order to protect the vehicle occupant located on the vehicle seat is triggered in the event of an impending collision or in the event of a collision, wherein upon the triggering of the protection element, a motion impulse is exerted on the vehicle occupant or at least on a body section of the vehicle occupant, by which motion impulse the vehicle occupant or at least a body section of the vehicle occupant is moved away from a collision section of the vehicle that is colliding or about to collide with the object. According to the invention, the intensity of the motion impulse is varied in relation to a determined accident severity and/or an identified accident type.

The intensity of the motion impulse and the resulting force acting on the vehicle occupant can thus be adapted to the anticipated accident severity and/or to the anticipated accident type and consequently to a specific load level so that the vehicle occupant is not subjected to unduly strong impulses.

The protection element is preferably triggered and/or activated in response to a control signal that signals a collision or an impending collision of the vehicle with an object, or a predetermined braking of the vehicle.

In an embodiment of the invention, in the event of an identified increasing accident severity a stronger motion impulse and consequently a correspondingly longer displacement distance is set for the vehicle occupant. By evaluating sensors that detect at least one vehicle environment, the accident severity (i.e., degree of severity of the accident, i.e., slight or severe impact), and/or the accident type (i.e., 90° side collision in the case of a swerving vehicle or acute angle side collision in the case of drifting wheels of the vehicle), is/are determined. Preference is given to determination of the severity degree and/or of the accident type in stages. This enables a discriminating and variable triggering and control of the protection element, thus achieving a comfort function along with the protective function (displacement of the occupant).

In an exemplary improvement of the invention, the intensity of the motion impulse and the resulting displacement distance of the vehicle occupant is also set in relation to a determined vehicle state, in particular in relation to the speed of the vehicle itself.

An exemplary embodiment provides that in the event of an identified high accident severity and intense lateral dynamics of the vehicle, in particular a skidding of the vehicle, the protection element is triggered in a controlled manner in such a way that a stronger motion impulse is exerted, and consequently a longer displacement distance is achieved, than in the event of an identified low accident severity.

If the speed of the vehicle itself exceeds a presettable threshold, i.e., the vehicle is traveling at high speed, the triggering of the protection element is preferably deactivated, as lateral dynamics become irrelevant in driving situations in the high speed range.

In the event of an identified impending collision or a foresightedly identified collision, the protection element is preferably triggered in such a way that the displacement of the vehicle occupant is initiated before the collision occurs. An acceleration thus acts upon the vehicle occupant prior to the occurrence of the collision, thus reducing the accident energy exerted as a consequence of a collision; in other words, the absolute value of the accident energy and thus a stress and/or acceleration maximum of the vehicle occupant, and thus passenger stress resulting therefrom, are reduced.

With the device for protecting a vehicle occupant in a vehicle seat of a vehicle, in particular a passenger car, at least one protection element arranged on the vehicle seat and capable of being triggered for protecting the vehicle occupant sitting on the vehicle seat can be triggered in the event of an identified impending collision or in the event of an identified collision. According to the invention, a means for setting the intensity of the motion impulse that can be exerted by the protection element on the vehicle occupant or at least on a body section of the vehicle occupant can be set in relation to a determined accident severity and/or a determined accident type and consequently to a specific load level.

As a result of the motion impulse, the distance is increased between the vehicle occupant and a collision section of the vehicle that is colliding or about to collide with the object. By varying the intensity of the motion impulse, a value for increasing the distance between the vehicle occupant and a collision section of the vehicle that is colliding or about to collide with the object can advantageously be adapted to the accident severity and/or to the accident type.

The intensity of the motion impulse preferably corresponds to the accident severity and/or accident type determined by means of the at least one control unit and/or sensors for detecting a vehicle environment and/or a vehicle state. In order to set the intensity of the motion impulse relative to the determined accident severity and/or accident type, the setting mechanism is coupled to the control unit and/or to the sensors.

As protection elements, preference is given to the vehicle seat having two opposite inflatable elements in the side walls, wherein only the inflatable element facing the anticipated collision site is triggered and inflated towards the vehicle occupant in response to the control signal. This ensures that the motion impulse is expressed in the predetermined intensity. The vehicle occupant is displaced by the inflated element towards the interior of the vehicle and thus away from the deforming side region of the vehicle, e.g., the door lining or B-post.

As protection elements, preference is given to the vehicle seat having two opposite, movable armrests arranged on the vehicle seat, wherein only the armrest facing the anticipated collision site is triggered and moved towards the vehicle occupant in response to the control signal. With the movable armrest, the motion impulse can be applied to the whole surface of the vehicle occupant.

A restraining of the vehicle occupant is thus initiated much sooner than with a standard restraint system. Additionally, the vehicle occupant participates as soon as possible in the acceleration effected by the triggering of the protection element and acceleration peaks are thus reduced.

Essentially no relative speed is built up between the inflatable element and the vehicle occupant. Hence the relative speed between the vehicle occupant and the side zone of the vehicle is also always less than in a standard protection device with a vehicle occupant restraint system.

In a particularly advantageous embodiment, the invention allows an inflation of the inflatable element or a movement of the displaceable element and thus a displacement of the vehicle occupant away from the collision point in particular in response to a so-called pre-crash signal, before the vehicle actually collides with the object. By the inflating or moving element, the vehicle occupant is moved out of his/her seated position away from the collision section of the vehicle, i.e., the collision point, generating an additional distance between the vehicle occupant and the collision point. This additional distance represents an additional absorption distance, whereby the effects of the collision on the vehicle occupant are reduced. Additionally, the relative speed between the vehicle occupant and the vehicle structure intruding into the interior of the vehicle due to the collision can be reduced by the displacement of the vehicle occupant. In this process, the distance traveled by the vehicle occupant away from the collision point towards the vehicle interior can be used as an additional deformation distance in the event of a collision.

BRIEF DESCRIPTION OF THE DRAWING FIGURES

An example of embodiment of the invention shall be described in more detail in the following, with reference to a drawing.

Shown is:

FIG. 1 a device for protecting a vehicle occupant in a vehicle seat.

DETAILED DESCRIPTION

FIG. 1 shows a device 1 for protecting a vehicle occupant. The device 1 comprises various protection elements 2.1 to 2.$k$, which may, for example, serve as a lateral support and/or mitigate an impact force by inflating airbags. The protection elements 2.1 to 2.$k$ are associated with at least one vehicle seat, which is not shown in any greater detail.

The protection elements 2.1 to 2.$k$ are arranged on the vehicle seat and can be triggered for protecting a vehicle occupant sitting on the vehicle seat. The protection elements 2.1 to 2.$k$ may, for example, be an inflatable element integrated in a side of a backrest or in an armrest, such as a side cushion (also known as side airbag or air cushion), and/or an element that is displaceably mounted on the vehicle seat, such as a displaceable armrest.

Henceforth the protection element 2.1 shall be designated as "inflatable element 2.1" and the protection element 2.2 shall be designated as "displaceable element 2.2".

The side airbags are standard airbags or air cushions. Only the actuator needs to have a specific control feature in order to maintain the internal pressure in the airbag at a preset level and thus provide protection against intruding parts for as long as possible.

Each vehicle seat can thus comprise two inflatable, in particular two oppositely arranged elements 2.1 and two displaceable, in particular two oppositely arranged elements 2.2. These elements 2.1 and 2.2 in particular provide lateral support for the vehicle occupant in the vehicle seat. Inflatable elements 2.1 can also be integrated in an adjacent vehicle door and/or in the armrest.

The device 1 comprises a control unit 3, which can be, for example, a component of an onboard control device in the vehicle. The inflatable element 2.1 and/or the displaceable element 2.2 are generally triggered in the event of an impending collision or particularly in the event of a foresightedly or already identified collision.

For timely triggering of the elements 2.1 and 2.2, signals S can be fed to the control unit 3 from sensors 4.1 to 4.$n$ and/or from other control units. The control unit 3 may, for example, receive signals from at least one environment detection unit, at least one acceleration sensor, travelling speed or rotational speed sensor and/or data signals such as a pre-crash signal from another control unit.

The control unit 3 comprises processing modules not shown in detail that process the received signals S into a pre-crash signal and consequently into control signals SS for actuating at least one means for setting the protection elements 2.1 to 2.$k$. Alternatively or additionally, the received pre-crash signal can be processed into control signals SS by means of the control unit 3.

The means for setting the protection element or elements 2.1 to 2.$k$ can be a control valve and/or a regulator, which cooperates with means for inflating the inflatable element 2.1 or with means for moving the displaceable element 2.2.

The invention makes provision for the control unit 3 to activate at least one of the inflatable or displaceable elements 2.1 and 2.2 while the vehicle is operating such that the intensity of a motion impulse exerted on the vehicle occupant by means of the inflatable or displaceable elements 2.1 and 2.2 can be set in relation to a determined accident severity and/or to a determined accident type.

To this end, an accident severity (i.e., the degree of severity of an accident, mild or severe impact) is detected by means of the control unit 3 and the sensors 4.1 to 4.$n$ coupled thereto and, as far as the accident type (i.e., side collision at a 90° angle or at an acute angle with a swerving vehicle or drifting wheels) is concerned, the vehicle state (e.g., whether the vehicle is skidding, whether the wheels are drifting, a braking deceleration of the vehicle, a steer angle of the vehicle) is also detected. For determining the accident severity and/or the accident type, other parameters relating to the vehicle and/or to the vehicle environment such as features of the vehicle itself, road conditions, road surface, and the type and features of the collision object are detected, analyzed, and, if applicable, taken into account.

The severity and/or the type of the accident is/are in particular determined in stages. To this end, different trigger thresholds depending on the respective load level are preset for generating the control signal SS and thus for triggering the protection element 2.1 to 2.*k*.

As a result of a determined low accident severity, for example, at a low speed of the vehicle itself, a smaller motion impulse with a short displacement distance will be exerted on the vehicle occupant in a first stage (also known as a load level).

In a second stage with a determined high accident severity, a motion impulse greater than the smaller motion impulse of the first stage with a displacement distance longer than the short displacement distance will be set and exerted on the vehicle occupant.

In a third or fourth stage with a detected high accident severity and with detected intense lateral dynamics of the vehicle, in particular an identified skidding of the vehicle or an identified large side slip angle or drifting of the wheels, a stronger motion impulse with a long displacement distance will be exerted on the vehicle occupant.

Additionally, the triggering of the protection element 2.1 to 2.*k* can be deactivated on the basis of a specific load level, overriding all determined load level-specific stages, in the event of an identified high vehicle speed exceeding a presettable threshold. Furthermore, other stages can be defined and used for activating the control elements 2.1 to 2.*k*. It is also possible to deactivate already defined and active stages and reactivate possibly deactivated stages depending on the setting, vehicle type, desired safety and comfort function, and/or depending on other conditions.

The invention is based on the idea that in the event of, say, a side impact, a vehicle occupant is accelerated with a time delay because the vehicle occupant will be seated at a distance from an armrest or seat cushion or must overcome a slack in the form of, e.g., a softness of the seat foam or a hunched sitting position. In order to enable the vehicle occupant to participate in an acceleration as soon as possible with the aim of reducing acceleration loads acting on the vehicle occupant in the event of a collision, an acceleration or motion impulse/impetus is exerted on the vehicle occupant by means of the inflatable or displaceable element 2.1 to 2.2 (e.g., an inflatable cushion in the armrest, in the vehicle door, and/or in a side wall) before the collision (e.g., a lateral impact) and thus as soon as possible. In other words, the vehicle occupant is pre-accelerated.

In order to achieve optimum pre-acceleration, i.e., a suitable impetus acting on the vehicle occupant by the inflation or displacement of the respective element 2.1 to 2.2, the strength or intensity of the motion impulse is triggered in stages and adapted if necessary to the determined accident severity and/or to the determined accident type.

The impetus resulting from the triggering of the inflatable or movable element 2.1 to 2.2 and the subsequent lateral displacement of the vehicle occupant is preferably initiated before the occurrence of the collision. The pre-impetus acting on the vehicle occupant as a result of the triggering of the inflatable or movable element 2.1 to 2.2 is greater the more firmly the vehicle occupant bears against the outer seat side wall.

In addition, the preceding belt tensioning can be released by deactivating the retractor during or shortly after the triggering of the inflatable or movable element 2.1 to 2.2 and thus of the desired impetus acting on the vehicle occupant, in order to provide some freedom of movement, i.e., the necessary escape space for the vehicle occupant away from the collision point.

Such a combination of a release of the belt tensioning at the stepwise triggering of the movable/inflatable element 2.1 to 2.2 and an intensity of the applied motion impulse adapted to a specific load level ensures that the vehicle occupant, by adopting a suitable sitting position and by a resulting optimum impetus, is pre-accelerated in the anticipated impact direction so that his/her distance from the vehicle side adjacent to the impact is increased and the speed differential to intruding vehicle parts is reduced. At the same time the vehicle occupant, due to the optimized intensity of the impetus, is subjected to minimal stress. As soon as the impulse of the collision impact of the vehicle dominates, the distance already covered can be used as an additional deformation distance. This mitigates the collision impact on the vehicle occupant. In addition, the application of the motion impulse/impetus via the seat well can reduce stresses in the pelvic region.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for protecting a vehicle occupant in a vehicle seat of a vehicle, the method comprising:
   detecting an impending collision or collision of the vehicle with an object;
   detecting an accident severity or accident type; and
   triggering at least one protection element arranged on the vehicle seat when the impending collision or the collision is detected,
   wherein a motion impulse is exerted on the vehicle occupant or at least on a body section of the vehicle occupant when the protection element is triggered, by means of which motion impulse the vehicle occupant or at least a body section of the vehicle occupant is moved away from a collision section of the vehicle that is colliding or about to collide with the object, and
   wherein an intensity of the motion impulse is varied in relation to the detected accident severity or accident type.

2. The method as in claim 1, wherein a stronger motion impulse is set with increasing accident severity.

3. The method as in claim 1, wherein the intensity of the motion impulse and resulting displacement distance of the vehicle occupant are also set in relation to a determined vehicle environment or a determined vehicle state.

4. The method as in claim 1, wherein when an identified high accident severity and intense lateral dynamics of the vehicle are detected the protection element is triggered in a controlled manner in such a way that a stronger motion impulse is exerted and consequently a longer displacement distance is achieved than in the event of an identified low accident severity.

5. The method as in claim 1, wherein the triggering of the protection element is deactivated when the vehicle exceeds a certain, presettable speed.

6. The method as in claim 1, wherein when an impending collision is detected the protection element is triggered in such a way that the displacement of the vehicle occupant is initiated before the collision occurs.

7. A device for protecting a vehicle occupant in a vehicle seat of a vehicle, comprising:
  at least one protection element arranged on the vehicle seat that is configured to be triggered in order to protect the vehicle occupant located on the vehicle seat;
  a control unit configured to detect an impending collision or collision of the vehicle with an object; and
  a control valve or regulator coupled to the control unit and configured to set an intensity of a motion impulse exerted by the protection element on the vehicle occupant or at least on a body section of the vehicle occupant in relation to a determined accident severity or a determined accident type.

8. The device as in claim 7, wherein the control unit is configured to detect a vehicle environment or a vehicle state.

9. The device as in claim 7, wherein the at least one protection element arranged on the vehicle seat includes two opposite inflatable elements in side walls of the vehicle seat, wherein only the inflatable element facing the anticipated collision site is triggered in response to a control signal and inflated towards the vehicle occupant.

10. The device as in claim 7, wherein the at least one protection element arranged on the vehicle seat includes two opposite, movable armrests arranged on the vehicle seat, wherein only an armrest facing an expected collision site is triggered as a function of the control signal and moved towards the vehicle occupant.

* * * * *